(12) United States Patent
Restle et al.

(10) Patent No.: US 11,067,982 B2
(45) Date of Patent: Jul. 20, 2021

(54) METHOD FOR THE REMOTE CONTROL OF A FUNCTION OF A VEHICLE

(71) Applicant: DAIMLER AG, Stuttgart (DE)

(72) Inventors: Marc Oliver Restle, Vaihingen (DE); Tobias Hug, Magstadt (DE); Andreas Hiller, Stuttgart (DE); Thomas Wohlgemuth, Aichtal (DE); Michael Rick, Reichenau (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/631,320

(22) PCT Filed: Jun. 11, 2018

(86) PCT No.: PCT/EP2018/065338
§ 371 (c)(1),
(2) Date: Jan. 15, 2020

(87) PCT Pub. No.: WO2019/020261
PCT Pub. Date: Jan. 31, 2019

(65) Prior Publication Data
US 2020/0209854 A1  Jul. 2, 2020

(30) Foreign Application Priority Data
Jul. 27, 2017  (DE) .................. 10 2017 007 119.5

(51) Int. Cl.
*G05D 1/00*  (2006.01)

(52) U.S. Cl.
CPC ......... *G05D 1/0077* (2013.01); *G05D 1/0016* (2013.01)

(58) Field of Classification Search
CPC .......................... G05D 1/0077; G05D 1/0016
See application file for complete search history.

(56) References Cited

U.S. PATENT DOCUMENTS

| 3,260,826 A | 7/1966 | Johnson |
| 7,439,632 B2 | 10/2008 | Ogino et al. |
| (Continued) | | |

FOREIGN PATENT DOCUMENTS

| CN | 202976265 U | 6/2013 |
| CN | 103935320 A | 7/2014 |
| (Continued) | | |

OTHER PUBLICATIONS

Examination Report dated May 2, 2018 in related/corresponding DE Application No. 10 2017 007 119.5.
(Continued)

*Primary Examiner* — Peter D Nolan
*Assistant Examiner* — Mikko Okechukwu Obioha
(74) *Attorney, Agent, or Firm* — Patent Portfolio Builders PLLC

(57) ABSTRACT

A method for the remote control of a function of a vehicle by a mobile operating device, involves enabling or disabling the function of the vehicle, such as an autonomous function for maneuvering into or out of a parking space, based on a sensed movement of the operating device. Enablement of the function requires that the sensed movement is a micromovement, a micromovement being a movement that is limited in the extent thereof and/or in the dynamics thereof.

18 Claims, 1 Drawing Sheet

(56) References Cited

U.S. PATENT DOCUMENTS

| | | | |
|---|---|---|---|
| 9,690,387 B2 | 6/2017 | Hatton | |
| 10,002,525 B2 | 6/2018 | Scheerle et al. | |
| 10,661,787 B2* | 5/2020 | Schuler | G05D 1/0016 |
| 10,890,981 B2* | 1/2021 | Chen | G06K 9/00536 |
| 2006/0244312 A1 | 11/2006 | Ogino et al. | |
| 2009/0222149 A1 | 9/2009 | Murray et al. | |
| 2016/0170494 A1 | 6/2016 | Bonnet et al. | |
| 2017/0031446 A1* | 2/2017 | Clark | B64C 39/024 |
| 2017/0120932 A1* | 5/2017 | Szczerba | G06F 3/0346 |
| 2017/0286658 A1* | 10/2017 | Zamfir | G01C 19/5776 |
| 2018/0329410 A1* | 11/2018 | Schuler | G07C 9/00174 |

FOREIGN PATENT DOCUMENTS

| | | |
|---|---|---|
| CN | 204801930 U | 11/2015 |
| CN | 106945634 A | 7/2017 |
| DE | 102013010819 A1 | 12/2014 |
| DE | 102015108871 A1 | 12/2015 |
| DE | 102014019570 A1 | 6/2016 |
| DE | 112015002330 T5 | 3/2017 |
| DE | 102015219099 A1 | 4/2017 |
| DE | 102016007483 A1 | 12/2017 |
| EP | 20119607 A1 | 11/2009 |
| EP | 2930585 A1 | 10/2015 |
| WO | 2011041884 A1 | 4/2011 |
| WO | 2015010752 A1 | 1/2015 |
| WO | 2015199600 A1 | 12/2015 |
| WO | 2016159358 A1 | 12/2016 |

OTHER PUBLICATIONS

International Search Report dated Sep. 5, 2018 in related/corresponding International Application No. PCT/EP2018/065338.

Written Opinion dated Sep. 5, 2018 in related/corresponding International Application No. PCT/EP2018/065338.

Office Action dated Mar. 26, 2021 in related/corresponding CN Application No. 201880043369.7

* cited by examiner

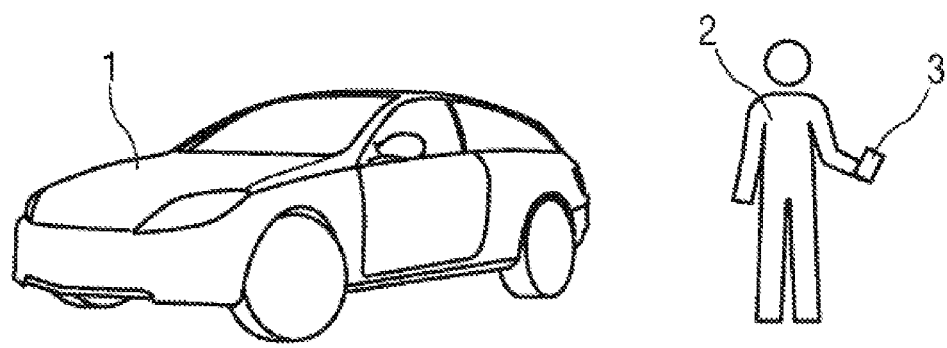

METHOD FOR THE REMOTE CONTROL OF A FUNCTION OF A VEHICLE

BACKGROUND AND SUMMARY OF THE INVENTION

Exemplary embodiments of the invention relate to a method for the remote control of a function of a vehicle by means of an operating device.

DE 10 2013 010 819 A1 discloses a method and a device for the remote control of a function of a vehicle in which signals from the vehicle are detected by at least one signal receiving unit integrated in a mobile control unit. An optical or acoustic signal is generated at at least one predetermined position on the vehicle, with the remote control being enabled only when the optical or acoustic signal is detected by the signal receiving unit.

WO 2015/010752 A1 discloses a method and a device for the remote control of a function of a vehicle using a touch screen. To ensure secure system behavior, raw data is sent from an unsecure operating unit to a secure evaluation unit in order to implement secure logic for the operation.

DE 10 2014019570 A1 discloses a method for the remote control of a function of a vehicle, in which the remote control takes place by a mobile unit wirelessly communicating with the vehicle, and in which the function is enabled for remote control only when a determined relative distance between the vehicle and the mobile unit is less than a predetermined distance threshold value. The relative distance is determined based on the determination of an initial position of the mobile unit and the determination of a movement of the mobile unit from the initial position.

Exemplary embodiments of the present invention are directed to a method for the remote control of a function of a vehicle that is improved over the prior art.

In a method according to the invention for the remote control of a function of a vehicle by means of a mobile operating device, in which the function, in particular an autonomous parking function, is enabled for execution or disabled depending on a detected movement of the operating device, the detected movement has to be a micromovement for the function to be enabled for execution. The statement that the detected movement is a micromovement is therefore a mandatory condition that must be fulfilled if the function is to be enabled for execution. Of course, it is conceivable that, in addition to this condition, other conditions must be fulfilled for the function to be enabled for execution.

Advantageously, the function is not enabled for execution or is disabled if no movement is detected. This ensures that the function does not start or that the function, if already started, is terminated or canceled if the operating device is kept absolutely steady by a vehicle user. Such a case is implausible and indicates a fault, because no vehicle user will be able to keep the operating device absolutely steady.

Advantageously, a movement of the operating device is judged to be a micromovement if slight fluctuations in the position and/or orientation of the operating device are detected. Fluctuations are understood to mean changes around an idle position, in particular movements/pivots back and forth.

The fluctuations are advantageously considered to be slight if they are limited in their magnitude and/or dynamics.

For example, the detected fluctuations in position are considered to be slight if they are less than approximately 30 cm in magnitude. It is particularly advantageous to consider the fluctuations to be slight if they are limited in magnitude to a range of a few centimeters or to a range of a few millimeters. Advantageously, the fluctuations are alternatively also considered to be slight or, in addition, only considered to be slight, if they take place at a speed which is less than a predetermined threshold speed of, for example, 2 m/s.

In an advantageous embodiment, the fluctuations are considered to be slight if they correspond to a movement that the vehicle user makes with a hand when trying to keep the operating device in his hand steady.

Advantageously, a detected gesture is validated by means of the detected micromovement. A gesture may, for example, be an action carried out on a touchpad of the operating device, for example a touch or swiping movement, in particular a circular swiping movement. If, for example, such a gesture is detected and a micromovement is detected at the same time, the gesture is advantageously considered to be valid.

Advantageously, an acceleration and/or rotation of the operating device is detected in order to detect the movement of the operating device.

In an advantageous embodiment of the invention, detected movement and/or position data of the operating device are transmitted from the device to an evaluation unit that complies with predetermined security guidelines.

By applying the method, it is possible to activate the function of the vehicle, for example parking, relatively quickly. In addition, the activation is intuitive and relatively easy to understand for a vehicle user, and can thus be easily carried out.

The relative ease of understanding encourages a natural process for the remote controlled parking, with the vehicle user being less distracted and more attention being paid to the parking, i.e., to the remote control.

BRIEF DESCRIPTION OF THE DRAWING FIGURE

Embodiments of the invention will be explained in more detail below with reference to a drawing, in which:

FIG. 1 schematically shows a vehicle and a vehicle user with an operating device.

DETAILED DESCRIPTION

In the single FIGURE, a vehicle 1 and a vehicle user 2 are shown with an operating device 3, in particular with a mobile data processing unit in the form of a smartphone. The operating device 3 is provided for the remote control of a function of the vehicle 1, with an autonomous parking operation of the vehicle 1 being described as the remote-controllable function in the present embodiment. The operating device 3 is thus used to control the autonomous parking operation, i.e., the parking operation can be started, maintained and terminated or interrupted by an input by a vehicle user on the operating device 3. The remote-controlled function can equally be an autonomous function for backing out of a parking space.

The operating device 3 may alternatively also be a tablet PC and/or another suitable device for the remote control of the function.

An acceleration sensor and a rotational speed sensor are integrated in the operating device 3 such that an acceleration and a rotational speed acting on the operating device 3 can be detected.

Alternatively, only one acceleration sensor or only one rotational speed sensor is integrated in the operating device 3, it being possible for the number of the respective detection units to also vary.

As described above, the operating device 3 is provided for the remote control of a function of the vehicle 1, in particular for remote-controlled parking, with the vehicle user 2 being located outside the vehicle 1 for this purpose.

Additionally, or alternatively, other functions of the vehicle 1 can be controlled by means of the operating device 3, for example other autonomous driving operations, e.g., backing out of a parking space, a light function, and/or opening and closing.

The operating device 3 is a smartphone with a transceiver unit for establishing a connection, in particular a radio link, between the vehicle 1 and the operating device 3.

If the operating device 3 is a consumer device, this often does not comply with the security guidelines required for vehicle applications, meaning there is a risk that secure data evaluation is possible only to a limited extent. The vehicle 1, however, typically includes controllers that comply with the required safety guidelines.

For this reason, a closed communication chain is established between the vehicle 1 and the operating device 3 during the remote control of the autonomous parking of the vehicle 1, it being possible for the vehicle 1 to be clearly identified and for an erroneous and/or third-party operation of the vehicle 1 to be largely excluded.

As described above, the operating device 3 embodied as a smartphone comprises an acceleration sensor and a rotational speed sensor, so that detected signals from the two detection units can be evaluated such that a driving enablement of the vehicle 1 for autonomous parking is automatically recognized.

If the vehicle user 2 holds the operating device 3 relatively steadily in his hand, with the operating device 3 being directed towards the vehicle 1, this can be considered to be an actuating gesture in relation to the parking operation.

Even when holding the operating device 3 relatively steadily, the vehicle user 2 still slightly moves his hand, as a result of which micromovements are detected by means of the acceleration sensor and/or rotational speed sensor and can be evaluated with respect to an intensity, a width and/or position.

If such micromovements are not detected during the actuating gesture, it can be concluded that a signal transmission is frozen.

Alternatively or additionally, the detection of such micromovements can also be used to validate an existing gesture recognition with respect to the autonomous parking operation; the operating device 3 in the form of the smartphone is moved back and forth relatively easily when performing a circular gesture with a corresponding movement.

If a change in the movement of the operating device 3 exceeding these micromovements is detected, the autonomous parking operation is terminated and the vehicle 1 is stopped. A change in the micromovement can also be caused, for example, by tapping the operating device 3, which is designed for example as a smartphone. During monitoring, an actuation of a button of the operating device 3 can also be secured in a possible embodiment.

Such a change in movement can be understood to mean, for example, that the vehicle user 2 turns the hand in which he holds the operating device 3 away from the vehicle 1 and/or makes a sudden movement with this hand.

Such a movement exceeding the micromovement suggests that the vehicle user 2 does not intend to move the vehicle 1 any further by means of the operating device 3, and a movement of this kind is no longer detected as an actuating gesture. The vehicle 1 is stopped and the autonomous parking operation is terminated.

In addition to the movement itself, an absolute position of the operating device 3 can be taken into account. For example, the vehicle 1 may be stopped when a display of the operating device 3 is directed downwards, regardless of whether the movement exceeds a threshold with respect to acceleration or speed.

By means of a method described above, an activation of the function of the vehicle 1 can take place relatively quickly, with the activation being intuitive and easy to understand for the vehicle user 2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for the remote control of a function of a vehicle by a mobile operating device, the method comprising:
    detecting movement of the operating device; and
    enabling execution of the function responsive to the detected movement being a micromovement;
    disabling execution of the function responsive to the detected movement not being a micromovement; and
    disabling execution of the function responsive to the detected movement exceeding an amount of movement of the micromovement,
    wherein the detected movement is a micromovement if the detected movement involves fluctuations in a position and/or orientation of the operating unit that are so slight that the fluctuations correspond to a movement that a vehicle user's hand makes when trying to keep the operating device steady in the vehicle user's hand.

2. The method of claim 1, wherein the function is not enabled for execution or is disabled if no movement is detected.

3. The method of claim 2, wherein the fluctuations are slight if the fluctuations are limited in magnitude.

4. The method of claim 2, wherein the fluctuations are slight if the movements are limited in their dynamics.

5. The method of claim 1, wherein a detected gesture is validated by the detected micromovement.

6. The method of claim 1, wherein an acceleration and/or rotation of the operating device is/are the detected movement.

7. The method of claim 1, further comprising:
    transmitting the detected movement and/or position data of the operating device to an evaluation unit that complies with predetermined security guidelines.

8. The method of claim 1, further comprising:
   detecting a gesture on the mobile operating device, wherein the execution of the function is enabled only when the micromovement is detected at the same time as the gesture is detected.

9. The method of claim 1, wherein the fluctuations are slight if the movements are less than 30 cm in magnitude or occur at a speed less than 2 m/s.

10. A method for the remote control of a function of a vehicle by a mobile operating device, the method comprising:
   detecting a gesture on the mobile operating device;
   determining if a micromovement of the mobile operating device occurred at a same time as the gesture is detected; and
   enabling execution of the function responsive to the micromovement being detected at the same time as the gesture is detected; and
   disabling execution of the function responsive to the micromovement not being detected at the same time as the gesture is detected,
   wherein the micromovement involves fluctuations in a position and/or orientation of the operating unit that are so slight that the fluctuations correspond to a movement that a vehicle user's hand makes when trying to keep the operating device steady in the vehicle user's hand, and
   wherein the function corresponds to the gesture.

11. The method of claim 10, wherein when the execution of the function is enabled, the method further comprising:
   determining whether the mobile operating device is pointed downwards; and
   disabling execution of the enabled function responsive to determining that the mobile operating device is pointed downwards regardless of whether or not the micromovement is detected.

12. The method of claim 10, wherein when the execution of the function is enabled, the method further comprising:
   determining whether a micromovement is detected during execution of the enabled function; and
   disabling execution of the enabled function when it is determined that a micromovement is not detected during execution of the enabled function.

13. The method of claim 10, wherein the fluctuations are slight if the movements are less than 30 cm in magnitude or occur at a speed less than 2 m/s.

14. The method of claim 10, wherein when the execution of the function is enabled, the method further comprising:
   disabling execution of the function responsive to the detected movement exceeding a micromovement.

15. A method for the remote control of a function of a vehicle by a mobile operating device, the method comprising:
   detecting movement of the operating device; and
   enabling execution of the function responsive to the detected movement not exceeding a micromovement; and
   disabling execution of the function responsive to the detected movement exceeding a micromovement,
   wherein the detected movement is a micromovement if the detected movement involves fluctuations in a position and/or orientation of the operating unit that are so slight that the fluctuations correspond to a movement that a vehicle user's hand makes when trying to keep the operating device steady in the vehicle user's hand.

16. The method of claim 15, wherein when the execution of the function is enabled, the method further comprising:
   determining whether the mobile operating device is pointed downwards; and
   disabling execution of the enabled function responsive to determining that the mobile operating device is pointed downwards regardless of whether or not the micromovement is detected.

17. The method of claim 15, wherein when the execution of the function is enabled, the method further comprising:
   determining whether a micromovement is detected during execution of the enabled function; and
   disabling execution of the enabled function when it is determined that a micromovement is not detected during execution of the enabled function.

18. The method of claim 15, wherein the fluctuations are slight if the movements are less than 30 cm in magnitude or occur at a speed less than 2 m/s.

* * * * *